(No Model.)  2 Sheets—Sheet 1.
A. CHAPIE.
POTATO PLANTER.
No. 444,192.  Patented Jan. 6, 1891.
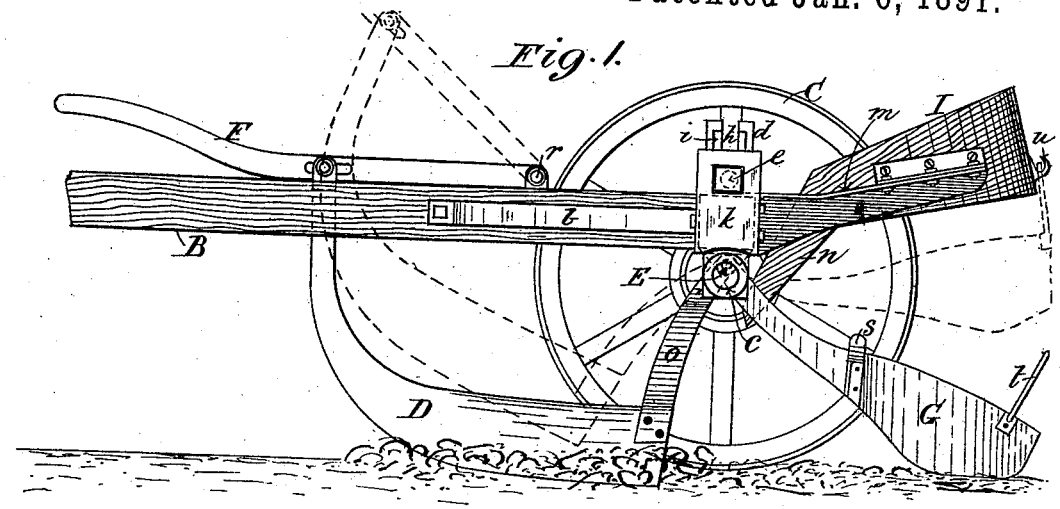
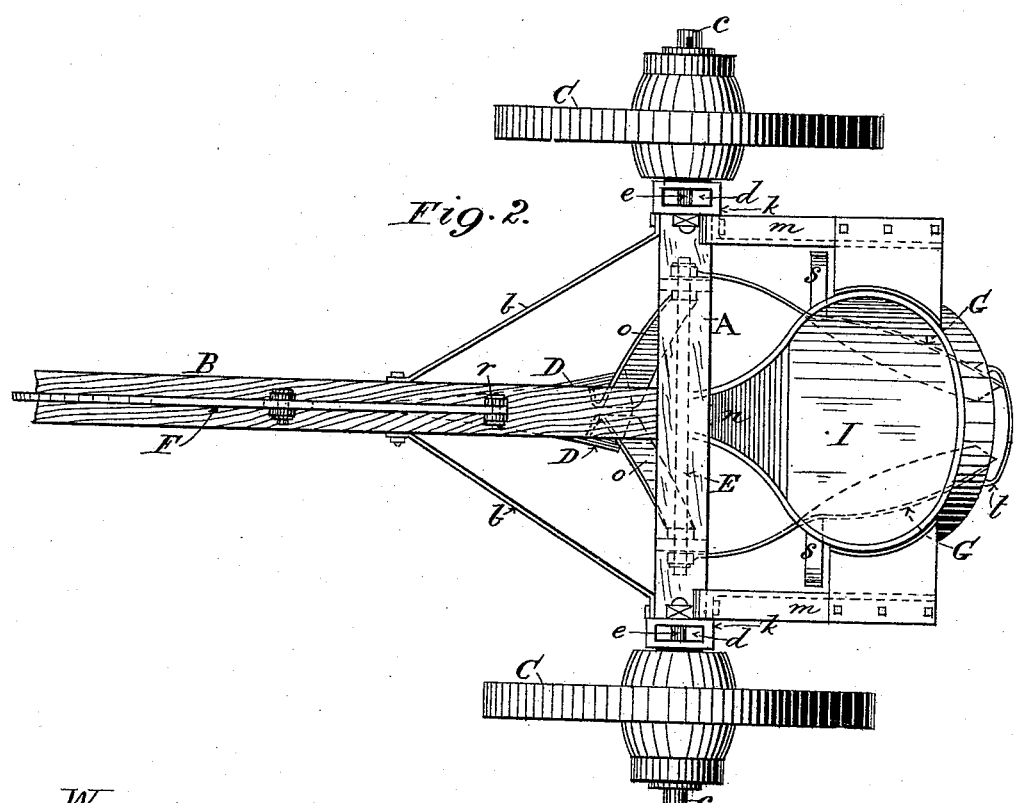
WITNESSES
Jos. W. Crookes
Wm. M. Byrne
INVENTOR
Alexander Chapie by
Paul Bakewell
his attorney (No Model.) 2 Sheets—Sheet 2.
A. CHAPIE.
POTATO PLANTER.
No. 444,192. Patented Jan. 6, 1891.
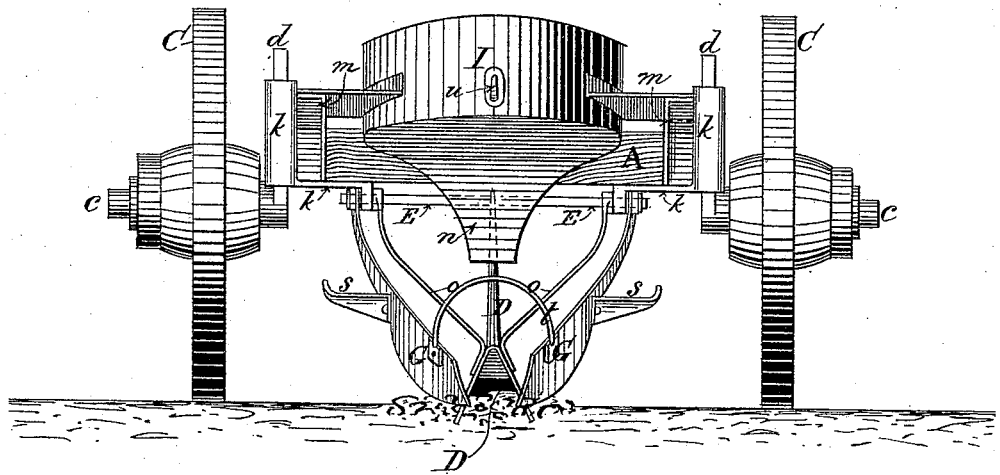
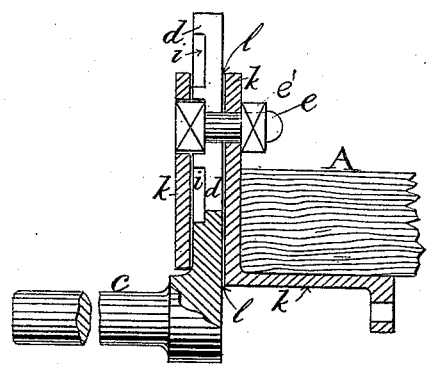
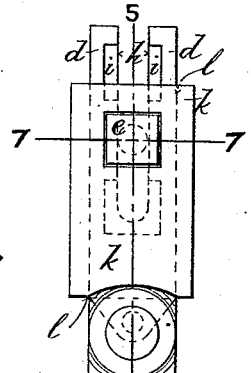
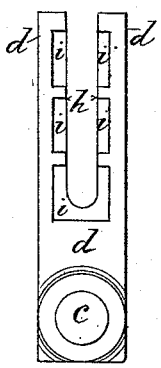
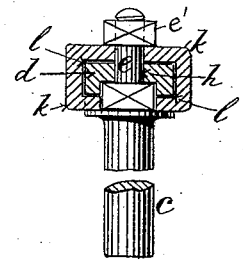
WITNESSES
Jos. W. Crookes
Wm. M. Byrne
INVENTOR
Alexander Chapie
by Paul Bakewell
his attorney

UNITED STATES PATENT OFFICE.

ALEXANDER CHAPIE, OF FLORISANT, MISSOURI.

POTATO-PLANTER.

SPECIFICATION forming part of Letters Patent No. 444,192, dated January 6, 1891.

Application filed May 12, 1890. Serial No. 351,532. (No model.)

*To all whom it may concern:*

Be it known that I, ALEXANDER CHAPIE, a citizen of the United States, residing at Florisant, in the county of St. Louis and State of Missouri, have invented certain new and useful Improvements in Potato-Planters, of which the following is a full, clear, and exact description.

My invention relates to improvements in that class of agricultural implements which are used for putting seed into the ground, and which carry plows for making the furrow for the seed and for covering the seed.

It has for its object the production of a seed-planter designed, with the necessary plows attached, for planting potatoes, constructed so as to furnish convenient means for carrying the supply of seed, means for conveniently dropping the seed at the proper place, and suitable and simple adjustments about the mounting of the planter for putting the furrow and covering plows to the proper depth and for raising them when it is necessary; and it consists in features of novelty hereinafter described.

In the accompanying drawings, Figure 1 is a side elevation of my planter with the near wheel removed. Fig. 2 is a plan of the planter. Fig. 3 is an end view of the same, taken from the back of the planter. Figs. 4, 5, 6, and 7 are detail views of the axle adjustment for regulating the relative height of the supporting-frame of the machine, Fig. 4 being a side elevation of the two parts attached, respectively, to the axle-beam and to the axle proper, Fig. 6 a side view of the piece forming an extension of the axle proper, and Figs. 5 and 7 being respectively vertical and horizontal cross-sections taken on lines 5 5 and 7 7 in Fig. 4.

In the following description like letters of reference denote like parts in the several figures in the drawings.

I mount the different parts of my planter on a simple T-shaped frame formed by the axle-beam A, to which is secured and braced by the bracing-rods $b$ a tongue B. The axle-beam A, and with it the attached parts of the planter, are preferably supported by the two wheels C, which have their axles $c$ adjustably secured to the ends of the axle-beam A. The distance apart of the wheels $c$ is preferably the same as the distance between rows, so that the furrow into which the seed is dropped being midway between them the outside wheel-track of the last row may be used as a marker for the next row.

Instead of mounting the wheels directly on the end of the axle-beam A, I preferably mount them so that the relative height of the axle-beam A is adjustable, and in this way regulate the running depth of the furrow-plow. To do this I make the axle proper $c$ with an extension $d$, formed at right angles to the axle. This extended part $d$ is formed with a longitudinal slot $h$, preferably open at the top to accommodate the shank of the fastening-bolt $e$. At convenient distances apart recesses $i$ are cut in the side of the slot through part of the thickness of the piece $d$ to accommodate the head of the bolt $e$ and form shoulders to prevent the axle-piece $d$ from slipping when fastened by the nut $e'$.

To the ends of the axle-beam A, I rigidly secure a casting $k$, which is formed with a vertical channel-way through the middle of the same, preferably open at both ends, to accommodate the body of the piece $d$, which fits into and slides up and down in it. Holes are cut in the piece $k$ to accommodate the shank and head of the bolt $e$, by which they are fastened together.

Supported on the machine by arms $m$, attached to the axle-beam A, I place the seed-hopper I, inclined so that the seed will tend to roll toward the narrow portion which leads to the seed-chute $n$, the office of which is to convey or direct the seed, when it is dropped by the boy assistant who rides on the planter facing the seed-hopper, to the proper place behind the furrow-plow D. I attach the back end of the furrow-plow D to the frame of the planter by pivotally securing its extended or attached arms $o$ to the bolt E, which is secured to the under side of the axle-beam A. The forward or nose end of the plow D is bent upward and extends through a slot cut for it in the tongue B. Its end is connected to a lever-arm F, which has its fulcrum-bearing $r$ near the back end of the tongue B. The office of this is to furnish means for raising the plow out of the ground, as is necessary in turning, as is shown in dotted lines in Fig. 1. The bolt E also acts as a support for the forward end of the covering-plows G, which are pivotedly secured thereto.

The plows G are given depth by having ears or foot-rests s attached thereto at a position convenient for the feet of the assistant as he sits on the seat conveniently secured to the frame-work of the machine, (not shown,) so that he can force them into the ground. They are connected together by a bent rod t, which also serves to keep them at the proper distance apart and as a convenient handle to raise them up out of the ground, when they can be fastened in this position by passing the bent rod t over the hook u, secured to the back side of the hopper-box I.

I claim—

1. In a potato-planter, the combination, with the axle having adjustable spindles and a draft-beam, of a furrow-opener pivoted on the axle and having its forward end adjustably supported from the draft-beam, substantially as and for the purposes described.

2. In a potato-planter, the combination, with a T-frame composed of draft-beam and main axle, of adjustable spindles for said axle, a furrow-opener pivoted at its rear end to the axle and adjustable at its front end by means of a lever pivoted on the draft-beam, a hopper mounted upon the main frame in rear of the axle, and a furrow-closer pivoted at its front end to the axle and having a connecting-bar on its rear upper edge, forming a handle by which it may be suspended from the hopper, substantially as and for the purposes described.

3. In a potato-planter, the combination, with a main axle having adjustable spindles, of a furrow-opener pivoted at its rear on the axle and furrow-closers pivoted at the front ends on the said axle and having foot-rests for holding the same in the ground, substantially as and for the purposes described.

4. In a potato-planter, the combination, with the main axle, of a vertically-channeled plate secured thereto and having holes therein for the passage of a clamping-bolt, a spindle having an arm at right angle thereto, adapted to fit in said channel, said extension or arm having an open slot therein, and a series of recesses each side of said slot for the reception of the head of the clamping-bolt, substantially as and for the purposes described.

5. In a potato-planter, the combination, with the axle, of a furrow-opener pivoted at its rear end on said axle, a gravity furrow-closer pivoted at its front end on said axle, and a hopper which delivers immediately below the axle and between the furrow opener and closer, whereby the several parts have a common center of support, substantially as and for the purposes described.

6. In a potato-planter, the combination, with the main axle, draft-beam, and through-bolt, of a furrow-opener, and a furrow-closer pivoted on the axle, a bar in the form of a handle connecting the furrow-closers, and a hopper secured to the frame, having a rear extension in the path of the handle for retaining the same in a raised position, substantially as and for the purposes described.

7. In a potato-planter, the combination, with the main axle, of end plates for the reception of adjustable spindles, said end plates having bearings for a through-bolt which connects said end plates, a through-bolt which connects the said end plates and forms a pivot for the furrow-opener and furrow-closer, and a furrow-opener and a furrow-closer pivoted on said through-bolt, substantially as and for the purposes described.

8. In a potato-planter, the combination, with the axle, of end plates having vertical channels with transverse bolt-slots, spindles having bifurcated arms at right angles to the spindles, adapted to enter the channels in the end plates of the axle, and said bifurcated arms provided with recesses for the reception of a bolt-head, and bolts and nuts for securing the spindle-arms in the end plates of the axle, substantially as and for the purposes described.

In testimony whereof I have affixed my signature, in presence of two witnesses, this 5th day of May, 1890.

ALEXANDER CHAPIE.

Witnesses:
J. W. CROOKES,
PAUL BAKEWELL.